(12) United States Patent
Szapiel et al.

(10) Patent No.: US 7,869,125 B2
(45) Date of Patent: Jan. 11, 2011

(54) MULTI-MAGNIFICATION VIEWING AND AIMING SCOPE

(75) Inventors: Stanislaw Szapiel, Port McNicoll (CA); Brien Ross, Wyevale (CA)

(73) Assignee: Raytheon Company, Waltham, MA (US)

( * ) Notice: Subject to any disclaimer, the term of this patent is extended or adjusted under 35 U.S.C. 154(b) by 479 days.

(21) Appl. No.: 11/975,109

(22) Filed: Oct. 16, 2007

(65) Prior Publication Data

US 2009/0015935 A1 Jan. 15, 2009

(30) Foreign Application Priority Data

Apr. 17, 2006 (WO) ............... PCT/US2006/014550

(51) Int. Cl.
*G02B 23/00* (2006.01)
*G02B 23/14* (2006.01)

(52) U.S. Cl. ..................... 359/421; 359/399; 359/432

(58) Field of Classification Search ......... 359/399–432, 359/676, 644
See application file for complete search history.

(56) References Cited

U.S. PATENT DOCUMENTS

| 1,236,722 | A | 8/1917 | Lange |
| 3,045,545 | A | 7/1962 | Korones et al. |
| 3,572,886 | A | 3/1971 | Curtiss et al. |
| 3,813,172 | A * | 5/1974 | Walker et al. ............... 356/225 |
| 3,942,901 | A | 3/1976 | Ekstrand |
| 4,017,148 | A * | 4/1977 | Taylor ........................ 359/402 |
| 4,806,007 | A | 2/1989 | Bindon |
| 4,842,395 | A * | 6/1989 | Sato et al. .................... 359/380 |
| 4,989,962 | A * | 2/1991 | Kebo .......................... 359/354 |
| 5,653,034 | A | 8/1997 | Bindon |
| 5,691,842 | A | 11/1997 | Devenyi et al. |
| 5,737,119 | A | 4/1998 | Mladjan et al. |
| 5,924,234 | A | 7/1999 | Bindon |
| 6,005,711 | A | 12/1999 | Mai et al. |
| 6,487,809 | B1 | 12/2002 | Gaber |
| 2008/0186570 | A1 * | 8/2008 | Stenton ....................... 359/428 |

* cited by examiner

*Primary Examiner*—Thong Nguyen
(74) *Attorney, Agent, or Firm*—Lyudmila Lubashev; Saint St. Julian (57) ABSTRACT

A multi-magnification viewing and aiming scope includes a first imaging group including an objective lens lying on the optical path and an eyepiece lens lying on the optical path. The first imaging group forms a first image having a first magnification on the optical path at an image location. A second imaging lens group is controllably inserted into the optical path between at least some elements of the objective lens and the eyepiece lens. Upon insertion of the second imaging lens group into the optical path an optical combination of the first imaging group and the second imaging lens group forms a second image having a second magnification on the optical path at substantially the image location. The insertion may be accomplished by a tumbler mechanism upon which the second imaging lens group is mounted.

1 Claim, 3 Drawing Sheets

MULTI-MAGNIFICATION VIEWING AND AIMING SCOPE

This application claims the benefit of the International Application No. PCT/US2006/014550, filed Apr. 17, 2006 and U.S. Provisional Application No. 60/672,601, filed Apr. 18, 2005, the disclosure of which is hereby incorporated herein by reference.

This invention relates to a sighting device and, more particularly, to a sighting device that may be rapidly and controllably switched between two or more magnifications without losing its boresight.

BACKGROUND OF THE INVENTION

Refractive or reflective optical sights are used in a wide variety of applications to obtain increased magnification of a scene. In one common application, a viewing and aiming scope is affixed to the upper side of a rifle-type weapon used by a soldier or a hunter. The user sights through the viewing and aiming scope to acquire a target and aim the weapon toward the target to increase the likelihood of hitting the target with a projectile fired from the weapon.

One of the problems associated with a fixed-magnification viewing and aiming scope is that the field of view is limited and fixed. The larger the magnification of the scope, the smaller is the field of view. Even when the magnification is unity (1×), as in a reflex scope, the field of view of the scope is still a small fraction of the effective field of view of the unaided eye. Consequently, it can be difficult for the user to acquire a peripheral target through the viewing and aiming scope. One possibility is to take the eye away from the scope to acquire the target with the unaided eye, and then to look through the scope to aim, if the target is at a distance and is not moving too rapidly. The movement of the head and the need to adjust the eye to the scope image take time. Another possibility is to use a variable-magnification viewing and aiming scope having zoom lenses. The optics of such a viewing and aiming scope allow the magnification, and thence the field of view, to be controllably changed, so that the user can continuously view the scene through the scope, but the field of view of the scope is still limited.

In some situations, such as a soldier fighting in modern urban warfare, the rifleman is most effective in close-range situations, typically less than 50 meters to the target, when the target is viewed at unity magnification (i.e., 1×) through a non-magnifying reflex viewing and aiming scope used with both eyes of the user open. The reflex scope has an illuminated dot pattern that improves the rifleman's response and precision in emergency situations. However, the field of view is typically restricted to less than 10 degrees, which is significantly less than the field of view of the unaided eye. For intermediate ranges, typically 50-300 meters to the target, the user is more effective when viewing the target through a moderate-magnification viewing and aiming scope of about 2×-6× magnification, using one eye.

There is thus a conflict between requirements for different types of situations. Several different possible approaches and solutions have been proposed. It is not practical to carry two different types of viewing and aiming scopes to be interchanged according to the situation, because events may occur very quickly. In some designs, two viewing and aiming scopes are mounted together, which greatly increases the weight of the weapon and scope. Switching between two-eye, non-magnifying sighting and one-eye, magnified sighting may be difficult and confusing. In the Bindon approach, both eyes are open, and the user views the scene through one unaided eye and through one eye looking through a single viewing and aiming scope. The untrained user can be easily confused and disoriented due to the differences in magnification of the scene viewed by the unaided eye and the aided eye.

As mentioned above, the higher the magnification of the device, the smaller is the field of view available for the aided eye. Typically, a field of view of only 4-7 degrees is available for the aided eye when using a viewing scope according to Bindon's concept. Zoom viewing and aiming scopes require a relatively long time to zoom through the magnification range and for the user to adjust to the different scene and field of view at different magnifications. In particular, the user must be aware when changing magnification that the eye relief also changes, and an additional movement of the head either toward or away from the scope is required to see the maximum available field of view. Zoom viewing and aiming scopes also have poorer optical performance than single-magnification viewing and aiming scopes. In yet another approach, a split-field of view viewing and aiming scope has a higher magnification in the center of the viewing area and a lower magnification on the outer portions of the viewing area. The full target image is not seen for either the higher magnification or the lower magnification, and there can be blind spots between the two portions of the image.

There thus remains a need for an approach to multi-magnification viewing of a scene, particularly for close-in and intermediate-ranges such as encountered in urban warfare and other optics applications. The present invention fulfills this need, and further provides related advantages.

SUMMARY OF THE INVENTION

The present invention provides a multi-magnification viewing and aiming scope that is rapidly switchable between two or more magnifications and fields of view. The eye relief of the viewing and aiming scope is substantially unchanged when the magnification is changed, so that the user does not have to move the eye forward or backward to reacquire the image upon changing magnification. ("Substantially" in this context means that any change in eye relief is so small as to not be perceptible to the user, so that the user does not feel that it is necessary to move the eye toward or away from the viewing and aiming scope to maintain the view of the images when the magnification is changed.) The boresight of the scope is not significantly altered when the magnification and field of view (FOV) are changed, so that reticular sighting is not compromised when the magnification and field of view are changed. The magnification-changing apparatus is light in weight and compact, so that the viewing and aiming scope is of nearly the same weight and size as a conventional viewing and aiming scope having a fixed magnification and field of view. An application of the present viewing and aiming scope of most current interest is for use with military rifles, but it may be used for other rifles, other weapons, and for non-weapon applications such as spotting scopes.

In accordance with the invention, a multi-magnification viewing and aiming scope comprises a first imaging group having an optical path and including an objective lens group lying on the optical path, wherein objective lens group includes at least a first objective lens, and an eyepiece lens group lying on the optical path. The first imaging group forms a first image having a first magnification on the optical path at an image location. The viewing and aiming scope further includes a second imaging lens group that may be controllably inserted into the optical path between the first objective lens and the eyepiece lens group. Upon insertion of the second imaging lens group into the optical path, an optical combination of the first imaging group and the second imaging lens group forms a second image having a second magnification on the optical path at substantially the image location. ("Substantially" in this context means that the first and second images appear to a human user of the viewing and aiming scope as being unchanged in location, although they change in apparent subtended angle.) The images formed at the two magnifications are formed at substantially the same focal plane. ("Substantially" in this context means that the first and second images appear to a human user of the viewing and aiming scope as being imaged at the same focal plane, which preferably coincides with the retina of the eye.)

The first imaging group may further include an erector lying on the optical path between the objective and the eyepiece, to invert the image. The erector is preferably a reflective device, whereas the remaining optical elements of the first imaging group and the second imaging group are lenses. The first imaging group may also include a reticle lying on the optical path between the objective and the eyepiece, and an aperture stop lying on the optical path between the objective and the eyepiece. Desirably, the aperture stop is positioned such that the second imaging group, upon insertion into the optical path, lies between at the objective and the aperture stop. This arrangement makes use the space between the objective and the aperture stop, which is often unused in conventional optical devices.

In one embodiment, the objective lens group comprises the first objective lens, and a second objective lens spaced apart from the first objective lens. The second imaging lens group may be controllably inserted between the first objective lens and the second objective lens. In another embodiment, the second imaging lens group may be controllably inserted between the objective lens group and the eyepiece lens group. In the first embodiment, the second imaging lens group lies between lenses of the objective lens group; in the second embodiment, the second imaging lens group lies between all of the objective lenses, on the one hand, and the eyepiece lens group, on the other hand.

In its preferred refractive embodiment, the second imaging lens group desirably includes a negative-optical-power lens subgroup, and a positive-optical-power lens subgroup. Preferably, the negative-optical-power lens subgroup is closer to the objective lens of the first imaging group than is the positive-optical-power lens subgroup, when the second imaging lens group is inserted into the optical path.

The second magnification is preferably less than the first magnification. Most preferably, the second magnification is substantially unity. ("Substantially" in this context means that the unity magnification of the scene viewed through the viewing and aiming scope is not perceptibly different to a user from the magnification viewed with the unaided eye.)

There may be a scope housing in which the first imaging group and the second imaging group are received, and an attachment adapted for attaching the scope housing to a base. Provision for lighting the reticle, where present, may also be made.

Thus, in one preferred embodiment, a multi-magnification viewing and aiming scope comprises a first imaging group having an optical path and including a first objective lens lying on the optical path, a second objective lens lying on the optical path and spaced apart from the first objective lens, an eyepiece lens lying on the optical path, an erector lying on the optical path between the objective lens and the eyepiece lens, and an aperture stop lying on the optical path between the second objective lens and the eyepiece lens. The first imaging group forms a first image having a first magnification on the optical path at an image location. The viewing and aiming scope further includes a second imaging lens group that may be controllably inserted into the optical path between the first objective lens and the second objective lens. Upon insertion of the second imaging lens group into the optical path, an optical combination of the first imaging group and the second imaging lens group forms a second image having a second magnification on the optical path at substantially the image location. The viewing and aiming scope also includes a tumbler mechanism upon which the second imaging lens group is mounted. The tumbler mechanism controllably pivots the second imaging lens group about a tumbler axis perpendicular to the optical path. Other compatible features may be used with this embodiment.

Even more preferably, a multi-magnification viewing and aiming scope comprises a first imaging group having an optical path and including an objective lens group lying on the optical path, wherein the objective lens group includes at least one objective lens, an eyepiece lens lying on the optical path, an erector lying on the optical path between the objective lens group and the eyepiece lens, a reticle lying on the optical path between the objective lens group and the eyepiece lens, and an aperture stop lying on the optical path between the objective lens group and the erector. The first imaging group forms a first image having a first magnification on the optical path at an image location. The viewing and aiming scope further includes a second imaging lens group that may be controllably inserted into the optical path between the objective lens and the eyepiece lens. Upon insertion of the second imaging lens group into the optical path, an optical combination of the first imaging group and the second imaging lens group forms a second image having a second magnification on the optical path at substantially the image location. The second magnification is less than the first magnification. The second imaging lens group includes a negative-optical-power lens subgroup, and a positive-optical-power lens subgroup. The negative-optical-power lens subgroup is closer to the at least one objective lens of the first imaging group than is the positive-optical-power lens subgroup, when the second imaging lens group is inserted into the optical path. There is further a tumbler mechanism upon which the second imaging lens group is mounted. The tumbler mechanism controllably pivots the second imaging lens group about a tumbler axis perpendicular to the optical path between a non-inserted position wherein the second imaging lens group does not lie on the optical path, and an inserted position wherein the second imaging lens group lies on the optical path between the objective lens and the aperture stop.

The viewing and aiming scope may be readily and controllably switched between two magnifications and their respective fields of view by insertion or removal of the second imaging lens group. The user of the viewing and aiming scope keeps one eye on the optical path at the fixed eye relief position, and switches between the lower magnification having a wider field of view, and the higher magnification with a narrower field of view. If the lower magnification is unity, the user can readily use the second eye when the lower magnification is selected, while shifting to use of the single eye when the higher magnification is selected. When the magnifications and fields of view are switched, the boresight is retained so that aiming through a reticle is not lost.

The use of two magnifications is fully sufficient for many applications. An additional magnification range may be provided by making the first imaging group of variable magnification, such as a zoom lens system. The presence of the second imaging lens group increases the weight of the viewing and aiming scope very slightly as compared with a viewing and aiming scope that does not have the second imaging lens group and its capabilities, and has little effect on the size of the viewing and aiming scope because it is fitted into space along the optical path that would otherwise be unused.

The present approach provides the user of the scope important advantages. The scope is quickly and easily reconfigured between a lower magnification, wider field of view configuration most suitable for close-in viewing and aiming, and a higher magnification, narrower field of view configuration most suitable for distant viewing and aiming. In the preferred approach, the conversion is controllably achieved with a low-profile lever operable by the user of the scope.

The magnification of the lower-magnification configuration is typically about unity, or 1×, the same as the unaided eye. The user of the sight can conveniently view the scene with both eyes open. The field of view for the lower-magnification configuration is desirably as close to the field of view of the unaided eye as possible, and is typically as high as 20-30 degrees in the preferred embodiments. Conventional reflex scopes provide a near-unity lower magnification, but the field of view is small, typically on the order of about 10 degrees. Scopes using the Bindon approach do not meet these performance objectives.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
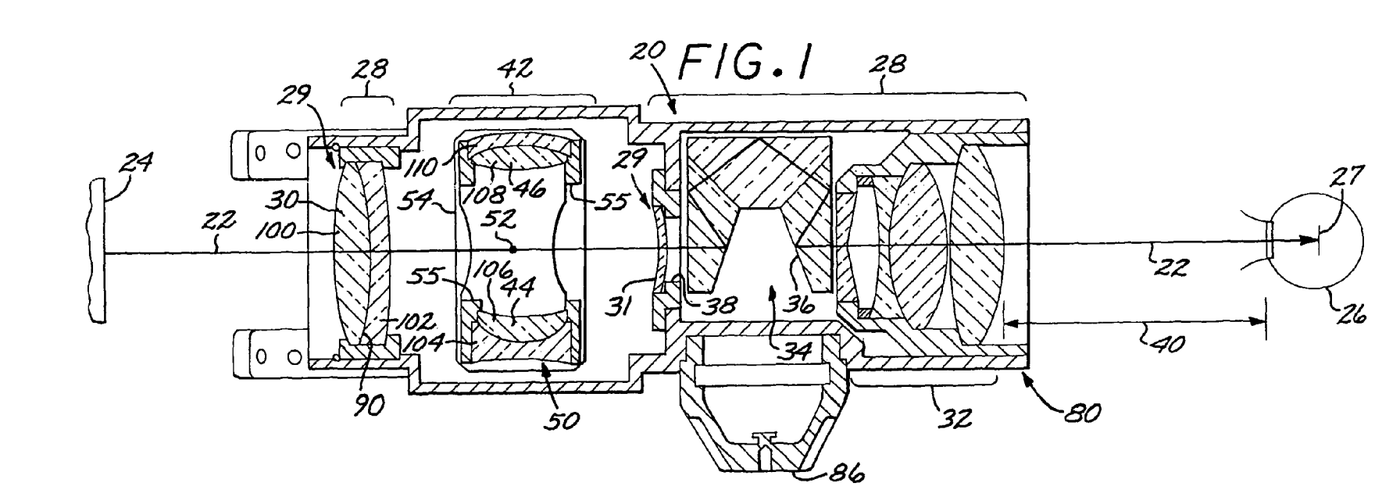
FIG. 1 is a side sectional view of a first embodiment of the structure of a viewing and aiming scope, with the second imaging lens group removed from the ray path.
Figure 2:
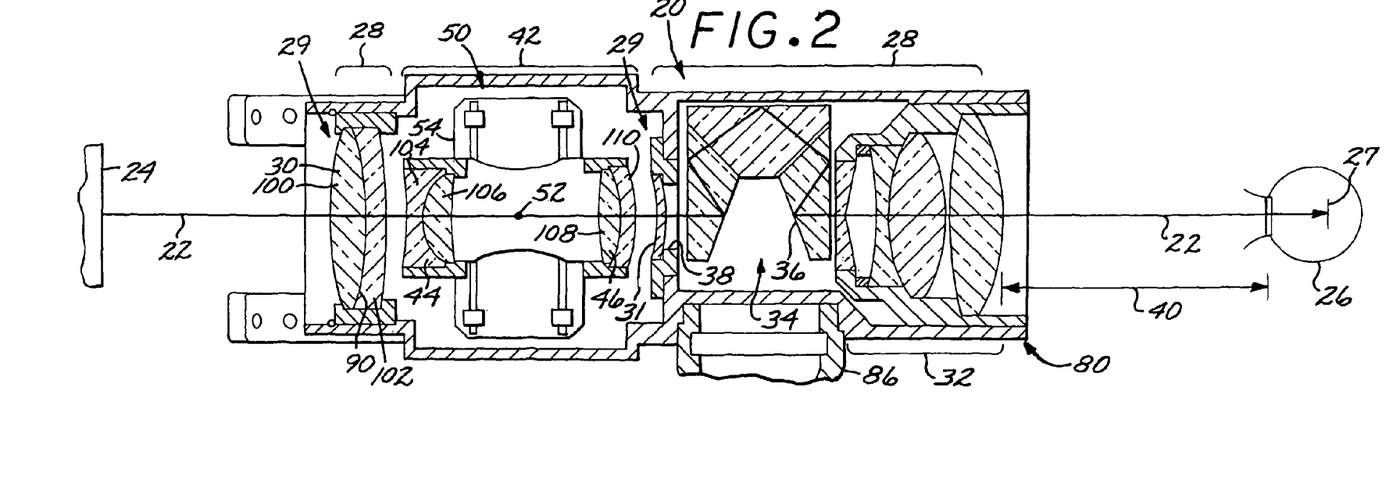
FIG. 2 is a side sectional view of the structure of the viewing and aiming scope of FIG. 1, with the second imaging lens group inserted into the ray path.

FIGS. 1-7 depict a first embodiment of a multi-magnification viewing and aiming scope 20. FIGS. 1-2 are sectional-view structural drawings showing a central ray of the optical path 22 as it passes through the viewing and aiming scope 20. The optical path 22 extends from a remote scene 24, through the viewing and aiming scope 20, and to an eye 26 of the user. For optimal viewing, the user positions the eye 26 at a relief distance 40 from the closest optical element of the viewing and aiming scope 20.

Figure 8:
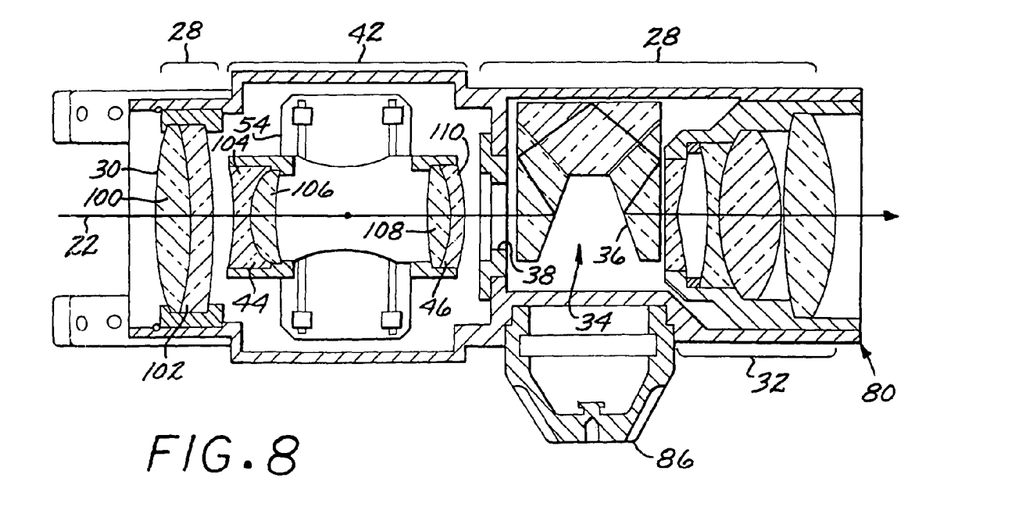
FIG. 8 is a side interior view of the structure of a second embodiment of the viewing and aiming scope, with the second imaging lens group inserted into the ray path.

The viewing and aiming scope 20 includes a first imaging group 28. The first imaging group 28 includes an objective lens group 29, which in turn comprises an optically positively powered first objective lens 30 lying on the optical path 22 at a location nearer the scene 24 than any of the other optical elements. In the illustration, the first objective lens 30 is formed as a cemented lens doublet (i.e., two lens joined together with optical cement). The objective lens group 29 may include, and does include in this preferred embodiment, a negatively powered second objective lens 31 that is spaced apart from the first objective lens 30 but also lies on the optical path 22. A second embodiment shown in FIG. 8 uses a different first objective lens 30 and does not have the spaced-apart second objective lens 31, but is otherwise the same as the preferred first embodiment.

The first imaging group 28 includes an optically powered eyepiece lens group 32 lying on the optical path 22 at a location nearer the eye 26 of the user than any of the other optical elements. The eyepiece lens group 32 may be of any operable type that is operable with, matched with, and compatible with the objective lens group 29 and with the second imaging lens group (described subsequently) that is controllably inserted into the optical path 22. The present approach has been tested with the illustrated four-element eyepiece lens group 32, and with other eyepiece lens groups as well.

The objective lens group 29 inverts the image of the scene 24, and preferably an erector 34 lies on the optical path 22 between the objective lens 30 and the eyepiece lens group 32. The erector 34 is an optically unpowered optical element that is preferably formed of reflective components, and which inverts the image produced by the objective lens group 29.

The first imaging group 28 further desirably includes a reticle 36 lying on the optical path 22 between the objective lens 30 and the eyepiece lens group 32. The reticle 36 typically has reference markings or other information that aids the user in aiming the viewing and aiming scope 20. In the preferred design, the reticle 36 is defined, preferably by engraving or etching, on the final reflective surface of the erector 34 that the optical path 22 reflects from prior to entering the eyepiece lens group 32. The reticle 36 may instead be defined on a separate, freestanding transparent piece that is inserted into the optical path 22, preferably between the erector 34 and the eyepiece lens 32. Preferably, an aperture stop 38 lies on the optical path 22, most preferably between the objective lens group 29 and the erector 34.

The first imaging group 28 forms a first image having a first magnification and first field of view on the optical path 22 at an image location, whose position depends upon the optical elements. The image location may be at infinity or at some finite location. In the preferred form of FIGS. 1-7, the image location is at infinity. Another preferred location of the virtual image is about 2.0 meters in front of the user, which corresponds to −0.5 diopter setting of the eyepiece. In each case, the scene is finally imaged on the focal surface, which is the retina 27 of the eye 26 when the eye 26 is positioned at the eye relief distance 40 from the closest point of the eyepiece lens group 32.

In the case of each optical component, such as the objective lens group 29, the eyepiece lens group 32, and the erector 34, the optical element may have a single lens or reflective component, or it may have more than one lens or reflective component. The first imaging group 28 is preferably of fixed magnification as illustrated, but it may be of a variable and controllable magnification.

The viewing and aiming scope further includes a second imaging lens group 42 that may be controllably inserted into the optical path 22 between the first objective lens 30 and the eyepiece lens group 32. In the illustrated preferred embodiment, the objective lens group 29 includes the first objective lens 30 and the second objective lens 31. The second imaging lens group 42 is inserted between the first objective lens 30 and the second objective lens 31. The first imaging group 28 may instead be formed with only the first objective lens 30 (i.e., without any lens 31), as in the embodiment of FIG. 8, and in this case the second imaging lens group 42 may be controllably inserted between the first objective lens 30 (and thence the entire objective lens group 29), on the one hand, and the eyepiece lens group 32, on the other hand.

Upon insertion of the second imaging lens group 42 into the optical path 22 (FIG. 2), an optical combination of the first imaging group 28 and the second imaging lens group 42 forms a second image having a second magnification and second field of view on the optical path 22 at substantially the same image location at which the first image of the first magnification is formed by the first imaging group 28 alone. The second imaging lens group 42 is termed an "imaging" lens group not because it forms an image when used by itself, but because it forms an image when used in combination with the first imaging group 28. That is, the first imaging group 28 by itself (when the second imaging lens group 42 is not inserted into the optical path 22) forms an image at the image location, FIG. 1; and the first imaging group 28 and the second imaging lens group 42 together form an image at the image location when the second imaging lens group 42 is inserted into the optical path 22, FIG. 2.

Preferably, the second magnification, obtained by the combination of the first imaging group 28 and the second imaging lens group 42 (FIG. 2), is less than the first magnification, obtained using only the first imaging group 28 (FIG. 1). Most preferably, the second magnification is unity (i.e., 1×, with no increase or decrease in field angle). The second magnification is preferably less than the first magnification, which is preferably about 2×-6×, because the inserted movable second imaging lens group 42 is subject to small variations from perfect alignment, and such small variations are less noticeable to the user for smaller magnifications than for larger magnifications. The user selects the second magnification for imaging when the features of the scene 24 are closer, and preferably views the scene 24 at unity magnification with both eyes open, one eye viewing the scene 24 through the viewing and aiming scope 20 and the other eye viewing the scene 24 directly. The user selects the first magnification for imaging when the features of the scene 24 are farther away, minimizing parallax errors, and preferably views the scene 24 at 2×-6× with one eye only, through the viewing and aiming scope 20.

The second imaging lens group 42 preferably includes a negative-optical-power lens subgroup 44 and a positive-optical-power lens subgroup 46. Most preferably, the negative-optical-power lens subgroup 44 is closer to the first objective lens 30 of the first imaging group 28 (and thence nearer the scene 24) than is the positive-optical-power lens subgroup 46, when the second imaging lens group 42 is inserted into the optical path 22 (FIG. 2).

Thus, the first imaging group 28 remains in the optical path 22 at all times, and the second imaging lens group 42 is controllably inserted into or removed from the optical path 22. Any operable approach may be used to insert (FIG. 2) the second imaging lens group 42 into the optical path 22 or remove (FIG. 1) the second imaging lens group 42 from the optical path 22. Desirably, such an approach is accomplished easily and quickly by the user, with little attention by the user to the actual mechanics, because the user may be subject to extreme distractions. Also, the mechanism desirably adds little weight and bulk to the viewing and aiming scope 20, since in the case of a rifle-mounted mechanism the user must support the weight by outstretched arms, and added bulk increases the likelihood of detection or snagging of the weapon on brush and the like.

In a presently preferred approach, the movable second imaging lens group 42 is mounted on a tumbler mechanism 50, whose structure is best seen in FIGS. 1-2 and 4-6. The tumbler mechanism 50 controllably pivots the second imaging lens group 42 by a sufficient amount (illustrated as the preferred 90 degrees) about a tumbler axis 52 perpendicular to the optical path 22 between the non-inserted position (FIG. 1) wherein the second imaging lens group 42 does not lie on the optical path 22, and the inserted position (FIG. 2) wherein the second imaging lens group 42 lies on the optical path 22 between the objective lens 30 and the eyepiece lens group 32, and most preferably between the objective lens 30 and the aperture stop 38. The tumbler axis 52 is perpendicular to the plane of the illustration in FIGS. 1-2 and 5-6, and is seen in perspective view in FIGS. 3-4.

The preferred tumbler mechanism 50 mounts the lens subgroups 44 and 46 into a frame 54 that accommodates the required 90 degree rotation and also ensures that the frame 54 does not obscure the optical path 22 when the second imaging lens group 42 is rotated to the non-inserted or removed position. The frame 54 is structured with an opening 55 through which the optical path 22 passes in an unobscured manner when the tumbler mechanism 50 is rotated so that the second imaging lens group 42 is removed from the optical path, as in FIG. 1. The frame 54 is mounted to a set of precision bearings 56, of which only the top bearing is visible in FIGS. 3-4, to be rotatable about the tumbler axis 52 as controlled by a low-profile, hand-accessible lever 58. The rotation is desirably highly reproducible, so that the second imaging lens group 42 is as close to the same position as possible each time it is rotated into the optical path 22. However, an adjustable rotational stop 60 is provided so that the allowable extent of rotation may be adjusted. The adjustment of the adjustable rotational stop 60 calibrates the line of sight in the azimuthal (horizontal) plane. The line of sight may be calibrated in the elevational (vertical) plane with an adjustment ring 62 on the bearings 56. The calibration adjustments are preferably performed out of the field, at the factory or other maintenance facility where proper calibration equipment is available.

The tumbler mechanism 50 is preferably bi-stable. That is, it is urged toward and stably retained in either of the end positions of FIGS. 1 and 2, by a detent mechanism 64 illustrated in FIGS. 4-6. A cam 66 is affixed to one end of a shaft 68 of the frame 54. The shaft 68 is mounted to the bearings 56 to accomplish the rotational movement of the frame 54. The cam 66 rotates to contact a pair of over-center springs 70. The cam 66 has a single contact 72 to each of the springs 70 when in the position shown in FIGS. 2 and 5, wherein the second imaging lens group 42 is inserted into the optical path 22. The single contact 72 between the cam 66 and each of the springs 70 preloads the tumbler mechanism 50 at a precisely defined rotational location against the adjustable rotational stop 60 when the cam tumbler mechanism 50 is in the inserted position of FIGS. 2 and 5. The cam 66 has two contacts 74 to each of the springs 70 when in the position shown in FIGS. 1 and 6, wherein the second imaging lens group 42 is removed from the optical path 22. The two contacts 74 to each of the springs 70 hold the tumbler mechanism 50 in a stable, but not necessarily precisely defined, out-of-the-way location when the tumbler mechanism 50 is in the second-imaging-lens-group removed position shown in FIGS. 1 and 6.

Figure 3:
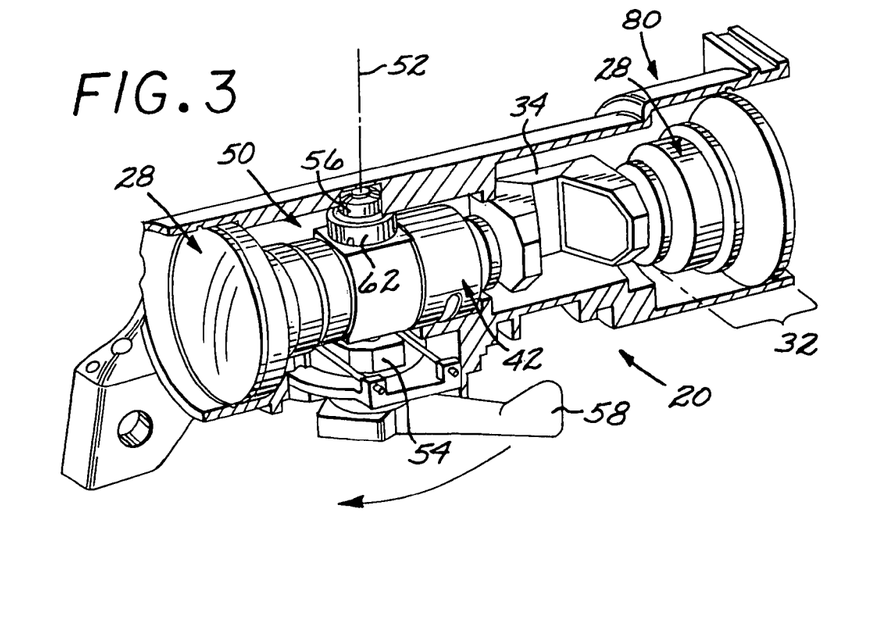
FIG. 3 is a cutaway perspective view of the viewing and aiming scope illustrating the tumbler mechanism, with the second imaging lens group inserted into the ray path as in FIG. 2.
Figure 4:
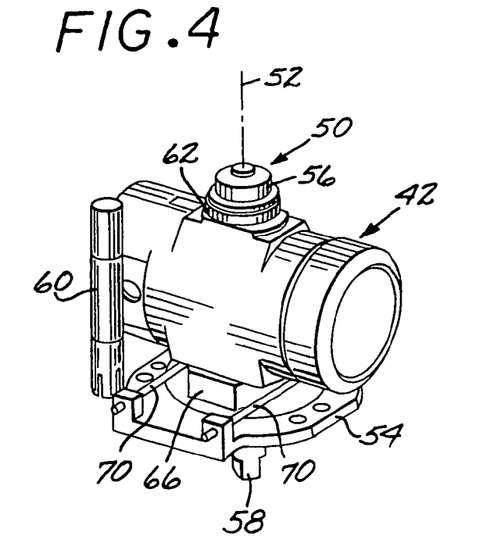
FIG. 4 is a perspective view of the tumbler mechanism.
Figure 5:
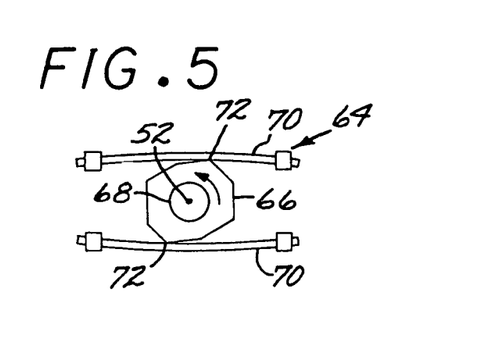
FIG. 5 is a plan view of the cam-retainer arrangement of the tumbler mechanism, with the second imaging lens group inserted into the ray path as in FIG. 2.
Figure 6:
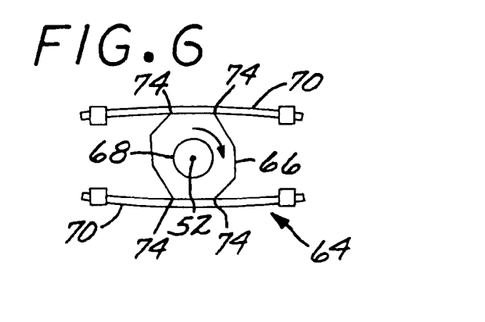
FIG. 6 is a plan view of the cam-retainer arrangement of the tumbler mechanism, with the second imaging lens group removed from the ray path as in FIG. 1.
Figure 7:
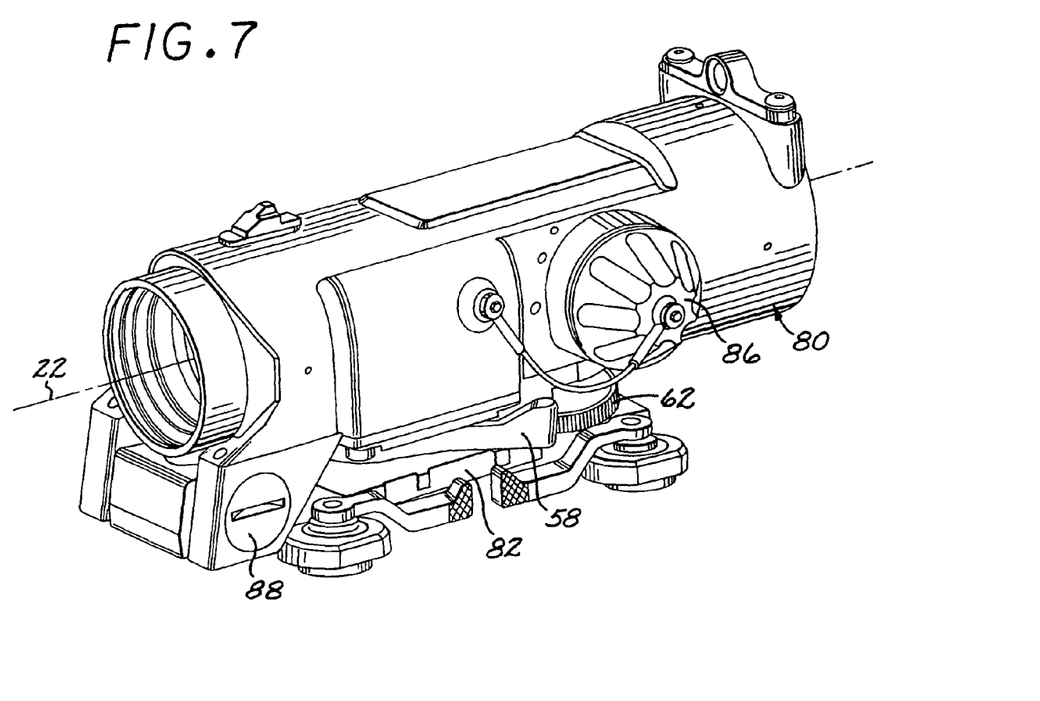
FIG. 7 is an exterior perspective view of the viewing and aiming scope.

As best shown in FIGS. 1-3 and in the external view of FIG. 7, the viewing and aiming scope 20 preferably further includes a scope housing 80 in which the first imaging group 28, the second imaging lens group 42, the tumbler mechanism 50, and the other components are received. The scope housing 80 may be provided with an attachment 82 adapted for attaching the scope housing 80 to a structure (not shown), such as a rifle or a tripod. In the illustrated embodiment of FIG. 7, the attachment 82 is a base that engages a corresponding mounting rail of a rifle, although any operable attachment may be used.

The reticle 36 may be illuminated by an illumination source, which is turned on and off by an externally accessible illumination switch 86 seen in FIGS. 1, 2, 7, and 8. Also visible in FIG. 7 is an azimuth adjustment 88 that adjusts the position of the rotational stop 60.

In a preferred design, the objective lens group 29 is formed as a cemented front doublet objective lens 90 having a front-doublet first lens 100 and a front-doublet second lens 102, and the rear singlet second objective lens 31. The second imaging lens group 42 (which is mounted to the tumbler frame 54) includes the cemented doublet negative-optical-power lens subgroup 44 having a negative-power subgroup-doublet first lens 104 and a negative-power-subgroup-doublet second lens 106. The second imaging lens group 42 further includes the cemented-doublet positive optical power lens doublet subgroup 46 having a positive-power-subgroup-doublet first lens 108 and a positive-power-subgroup-doublet second lens 110.

The preferred embodiment of FIGS. 1-7, except using a three-element rather than a four-element eyepiece lens group 32, has been designed in detail and reduced to practice using spherical lens surfaces. The following Table 1 summarizes the optical design of the viewing and aiming scope 20 according to this design. The nominal optimum Index of Refraction and Abbe Number (indicating the dispersion of the glass) for each of the types of glass are also provided.

TABLE 1

| Surf. No. | Radius | Thickness | Glass Material | Index of Refraction at d-line | Abbe number at d-line |
| --- | --- | --- | --- | --- | --- |
| 1 | 50.5 | 6.8 | N-SK2 | 1.607381 | 56.65 |
| 2 | −74.891 | 2.8 | N-SF4 | 1.775131 | 27.38 |
| 3 | −1343.419 | 5.5 | | | |
| 4 | −33.325 | 1.5 | N-LAK14 | 1.696800 | 55.41 |
| 5 | 8.6 | 5 | N-LAF7 | 1.749500 | 34.82 |
| 6 | 24.975 | 28.78617 | | | |
| 7 | 35.839 | 5.5 | S-LAM55 | 1.762001 | 40.10 |
| 8 | −11.33 | 1.5 | SFL57 | 1.84663 | 23.62 |
| 9 | −20.173 | 4.5 | | | |
| 10 | −32.904 | 1.5 | N-FK5 | 1.487490 | 70.41 |
| 11 | −67.456 | 2.5 | | | |
| 12 | infinity | 2 | | | |
| 13 | infinity | 24.8 | BAK4 | 1.568830 | 56.13 |
| 14 | infinity | 24.04 | BK7 | 1.516800 | 64.17 |
| 15 | infinity | 24.8 | BAK4 | 1.568830 | 56.13 |
| 16 | infinity | 1.94 | | | |
| 17 | infinity | 11.82394 | | | |
| 18 | −92.24013 | 2 | N-SF57 | 1.846942 | 23.79 |
| 19 | 31.19614 | 9.182126 | N-FK5 | 1.487490 | 70.41 |
| 20 | −30.01057 | 0.25 | | | |
| 21 | 56.88528 | 7 | N-LASF44 | 1.804200 | 46.50 |
| 22 | −46.07343 | 54 | | | |

In this Table 1, standard conventions for optical systems are used. A positive center of curvature of a surface is to the right of the surface as shown in the drawings FIGS. 1-2, and a negative center of curvature is to the left of the surface. The thickness is the axial centerline thickness to the next surface. Although units of length are arbitrary, the use of millimeters is preferred. The "Glass Material" is the glass that is found to the right of the surface with which it is associated, and the Index of Refraction and Abbe Number are for the respective associated glass.

The surfaces referenced in Table 1 are associated with specific lens elements as follows, see also FIGS. 1-2. Surfaces 1-3 are the surfaces of the cemented positive-optical-power achromat telephoto cemented front doublet objective lens 90; surfaces 4-6 are the surfaces of the cemented negative-optical-power achromat lens subgroup 44; surfaces 7-9 are the surfaces of the cemented positive-optical-power achromat lens subgroup 46; surfaces 10-11 are the surfaces of the singlet negative-optical power telephoto objective lens 31 made of low index of refraction, low dispersion glass; surface 12 is the aperture stop 38; surfaces 13-17 are the flat reflective surfaces of the unfolded prismatic erector 34; and surfaces 18-22 are the three-element eyepiece lens group 32.

With this design, with the second imaging lens group 42 inserted into the optical path 22 (FIG. 2), the field of view is 30 degrees, and the magnification is unity (1×). With the second imaging lens group 42 removed from the optical path 22 (FIG. 1), the field of view is 7.5 degrees and the magnification is 4.2×. The eye relief 40 is substantially the same for both configurations and is 54 millimeters. The exit pupil diameter is the same for both configurations and is 7.7 millimeters. The total length of the viewing and aiming scope 20 is 130 millimeters.

The field of view for the 1× configuration with the second imaging lens group 42 inserted is a remarkable 30 degrees. With conventional scopes the field of view is typically less than 10 degrees. The much larger field of view of the present approach allows the user of the scope 20 to see features that are well to the side of the boresight, so that the user can have a much greater ability to detect a peripheral target. For the best monitoring of the battlefield, the user can keep the scope 20 in the 1× configuration for as long as possible. When a remote target is detected and acquired, the user can instantly switch to high magnification configuration. This allows for much more precise aiming at the remote target. After the target is destroyed, the user instantly switches back to the 1× configuration and resumes monitoring of the battlefield with both eyes open. When the user switches between the configurations by operating the lever 58, the user maintains the eye 26 at the same axial position relative to the viewing and aiming scope 20, because the eye relief 40 does not change. These features taken together permit the user to keep one eye continuously viewing the scene through the viewing and aiming scope 20 and with the eye at the same distance from the scope 20, even when switching between the low-magnification, wide FOV mode and the high-magnification, low FOV mode. The user can therefore detect and react to threats more quickly than with other types of viewing and aiming scopes.

The present design is operable with a wide range of lens shapes and materials used in the lenses 90, 44, 46, 31, and 32. However, parametric design studies have resulted in substantially the nominal spherical lens shapes, glass materials, indices of refraction, and Abbe dispersion numbers indicated in Table 1. As used in this context, "substantially" means that the radii of the lenses should not vary by substantially more than 10 percent from the nominal indicated values, the indices of refraction should not vary by more than +/−7 percent from the nominal indicated values, and the Abbe numbers should not vary by more than +/−10 percent from the nominal indicated values. The radius and thickness numbers are relative, and can be scaled as needed for different sizes of the viewing and aiming scope 20. (These stated limitations on the variations apply only to the lenses 90, 44, 46, 31, and 32, and not to the glass of the reflective erector 34.)

For the optimum design of the front optics (i.e., the objective lens group 29 and the second imaging lens group 42), a number of conditions must be met. The first-order design conditions are as follows. (1) The back working distance (defined as the distance form the aperture stop 38 to the reticle plane 36) must be the same for all magnifications and sufficiently large to accommodate the length of the unfolded prismatic erector 34; (2) the clearance between the negative-optical-power lens subgroup 44 and the positive-optical-power lens subgroup 46 must be sufficiently large that the user will not see the lenses of the negative-optical-power lens subgroup 44 and the positive-optical-power lens subgroup 46 when the tumbler mechanism 50 is in the removed position (FIG. 1); (3) the clearances between the lenses of the objective lens group 29 and the lenses of the second imaging lens group 42 (including, when necessary, the aperture stop 38 as well) must be sufficiently large so that there is no mechanical interference when the tumbler mechanism 50 rotates about its tumbler axis 52; and (4) the length of the tumbler mechanism 50 should not significantly exceed the entrance pupil diameter for maximum magnification of the viewing and aiming scope 20, or the external mechanical diameter of the viewing and aiming scope 20 will have to be enlarged to hide the tumbler mechanism 50 properly inside, which would increase the size and mass of the viewing and aiming scope 20.

In a compact and lightweight scope, which, for a military user, must be of minimum size and mass, the above conditions can be met only if strong optical powers are chosen for both the negative-optical-power lens subgroup 44 and the positive-optical-power lens subgroup 46 of the second imaging lens group 42 mounted to the tumbler mechanism 50. Typically, the absolute value of the focal length of the negative-optical-power lens subgroup 44 and the positive-optical-power lens subgroup 46 can be on the order of 15-20 millimeters, and the f-numbers of the second imaging lens group 42 can be less than 2.0. The choice of strong powers and low f-numbers potentially cause problems with the proper correction of aberrations of the second imaging lens group 42. These potential difficulties are further increased by the need to locate the aperture stop 38 off the tumbler mechanism 50. The lack of symmetry about the aperture stop 38 creates large contributions from off-axis aberrations, especially transverse color, coma, astigmatism, and distortion. To correct chromatic aberrations properly, the negative-optical-power lens subgroup 44 and the positive-optical-power lens subgroup 46 must be composed of properly designed achromatic doublets. Adding more lenses to each subgroup 44 and 46 of the second imaging lens group 42 could make the correction of monochromatic aberrations easier, but the additional lenses would add to the weight and size of the viewing and aiming scope 20. The lens design objective is therefore to correct aberrations, even for large fields of view of the viewing and aiming scope 20, by using only lens doublets in the negative-optical-power lens subgroup 44 and the positive-optical-power lens subgroup 46.

Parametric design studies show that, for best results, the absolute value of the ratio of the optical power of the negative-optical-power lens subgroup 44 to the optical power of the positive-optical-power lens subgroup 46 should be maintained in the range of 1.00 to 1.30. Approximately equal positive and negative powers contribute to good control of the Petzval curvature and astigmatism. They are also advantageous for reduction of boresight errors, specifically the unwanted deviation of the line-of-sight of the viewing and aiming scope 20 due to imperfect location of the tumbler mechanism 50 when it is inserted into the optical path 22.

It is advantageous for correcting off-axis aberrations when the first surface of the negative-optical-power lens subgroup 44 is concave, and the index break (i.e., the difference of the index of refraction between the first lens 104 and the second lens 106) of the negative-optical-power lens subgroup 44 is about 0.05.

The preferred lens prescription set out in Table 1 delivers resolution better than 1.0 arc minute in observer space, for normal daylight (photopic) use, for both magnifications/fields of view, when the user's eye 26 is at the eye relief distance 40. The 1.0 arc minute resolution is also the limiting resolution of a human observer under the best working conditions.

As noted earlier, similar or identical performance results can be obtained when another set of glass materials, having differences in the indices of refraction with +/−7 percent and Abbe numbers with +/−10 percent of the original prescription data, is used. After choosing new glass materials, a commercial lens design software (such as CODEV or ZEMAX) may be employed to adjust all of the lens radii or curvature, thicknesses, and air gaps, to arrive at substantially the same design performance.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:
1. A multi-magnification viewing and aiming scope, comprising:
a first imaging group having an optical path and including:
an objective lens group lying on the optical path, wherein the objective lens group comprises:
a cemented front doublet objective lens comprising
a front-doublet first lens having a front-surface relative radius of 50.5, a back surface relative radius of −74.891, a thickness of 6.8, an index of refraction of substantially 1.607381, and an Abbe number of substantially 56.65, and
a front-doublet second lens having a front surface radius of −74.891, a back surface radius of −1343.419, a relative thickness of 2.8, an index of refraction of substantially 1.775131, and an Abbe number of substantially 27.38,
a rear singlet second objective lens having a front surface relative radius of −32.904, a back surface relative radius of −67.456, a relative thickness of 1.5, an index of refraction of substantially 1.487490, and an Abbe number of substantially 27.38, and
an eyepiece lens group lying on the optical path; and
a prismatic erector lying in the optical path between the objective lens group and the eyepiece lens group,
wherein the first imaging group forms a first image having a first magnification on the optical path at an image location; and
a second imaging lens group that is controllably inserted into the optical path between the front doublet objective lens and the eyepiece lens group, wherein upon insertion of the second imaging lens group into the optical path an optical combination of the first imaging group and the second imaging lens group forms a second image having a second magnification on the optical path at substantially the image location, wherein the second imaging lens group comprises:

a cemented doublet negative optical power lens subgroup comprising
- a negative-power-subgroup-doublet first lens having a front-surface relative radius of −33.325, a back surface relative radius of 8.6, a thickness of 1.5, an index of refraction of substantially 1.696800, and an Abbe number of substantially 55.41,
- a negative-power-subgroup-doublet second lens having a front-surface relative radius of 8.6, a back surface relative radius of 24.975, a thickness of 5, an index of refraction of substantially 1.749500, and an Abbe number of substantially 34.82, a cemented doublet positive optical power lens subgroup comprising
- a positive-power-subgroup-doublet first lens having a front-surface relative radius of 35.839, a back surface relative radius of −11.33, a thickness of 5.5, an index of refraction of substantially 1.762001, and an Abbe number of substantially 40.10,
- a positive-power-subgroup-doublet second lens having a front-surface relative radius of −11.33, a back surface relative radius of −20.173, a thickness of 1.5, an index of refraction of substantially 1.84663, and an Abbe number of substantially 23.62.

* * * * *